Dec. 28, 1954  A. E. CHISHOLM  2,697,915

CONDITION RESPONSIVE TWO-STAGE RELIEF VALVE

Filed Oct. 22, 1951

INVENTOR

Allen E. Chisholm

United States Patent Office 2,697,915
Patented Dec. 28, 1954

2,697,915

CONDITION RESPONSIVE TWO-STAGE RELIEF VALVE

Allen E. Chisholm, Portland, Oreg.

Application October 22, 1951, Serial No. 252,465

7 Claims. (Cl. 62—1)

This specification is a disclosure of a pressure relief valve which is condition responsive to pressure, or condition responsive to temperature in that it may be set to relieve at a predetermined pressure and to close at a predetermined lower pressure, at normal temperatures, and to relieve such lower pressure at a predetermined abnormal temperature. I name it a condition responsive two stage relief valve to distinguish it from the conventional relief valve.

This invention is especially useful in protecting pressure vessels used for storing liquid petroleum gases, hereinafter abbreviated as L. P. G., and will be described as applied to such usage although it may be successfully used with vessels whose contents do not consist of L. P. G.

L. P. G. in the liquid state must be confined under pressure at normal or lower temperature. A reduction in pressure and/or a raise in temperature results in a change of a portion of the liquid into a vapor state with increase in volume.

Vessels used for the storage of propane for example are usually provided with one or more conventional relief valves set to relieve at 250 p. s. i. with shut off at 225 p. s. i. When such vessels are exposed to solar heat the relief valves may at intervals discharge small quantities of gas. In the event of a fire near the vessel the relief valves will usually discharge sufficient gas to prevent rupturing the vessel. During such discharge the expansion of gas thru the relief valve provides refrigeration sufficient to keep the valve operationally cool. Also the internal evaporation produces a refrigerative effect in cooling the vessel.

However, in cases of prolonged intensive external heat all of the liquid becomes vaporized and discharged thru the relief valve, whereupon, there being no more liquid which may be vaporized and expanded the valve closes and entraps the residual vapor at a pressure of 225 p. s. i. Under such condition there is no further refrigerative effect; the external heat raises the temperature of the metal comprising the vessel; the metal yields due to elevated temperature and internal pressure; and a disastrous explosion occurs.

The primary object of my invention is to provide, for pressure vessels, a relief valve which is normally operative under normal conditions one of such conditions being that a portion of the vessel's contents must be in the liquid state, and thermal means capable of releasing the normal restraining means of the valve when all of the liquid within the vessel has been vaporized by abnormal thermal conditions, thereby to relieve the internal pressure to atmosphere or some predetermined low pressure of safety value. This object, when accomplished, alleviates one dangerous hazard prevailing in the conventional relief valve, i. e., prevention of an explosion during a major fire near the vessel.

However, a subsequent hazard may occur. L. P. G. when in storage is a pure gas, non-explosive. If the pure gas is admixed with air in certain proportion the mixture becomes highly explosive.

A major fire near the vessel will eventually extinguish and the vessel will gradually attain normal temperature. During such cooling process the vapor content also cools with decrease in volume thus reducing the internal pressure of the vessel. If the internal pressure becomes less than the external pressure, such as atmosphere pressure, a potential condition exists for air to enter the vessel and thus lean the pure gas into an explosive mixture, which, if ignited, would produce an explosion of magnitude dependent on the volumetric contents of the vessel.

Hence a further object of my invention is to prevent entry of air to interior of vessel if and when the internal pressure is less than external pressure.

Another object is to provide in a valve, which accomplishes the foregoing objects, simplified construction with minimum component parts necessary to insure reliable operation.

The foregoing and other objects, which will be clear to those skilled in the art of protecting pressure vessels, are to be found in the specification, infra, and are particularly pointed out in the claims.

Drawings accompany and form a part hereof in which:

Similar symbols denote similar parts of the device in each of the several figures.

Figure 2:
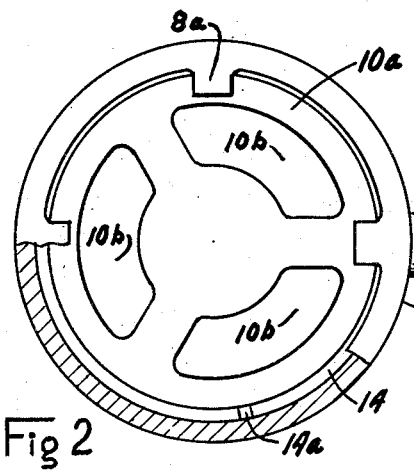
Figure 2 is a top plan view, partially sectioned at line 2—2 of Fig. 1.
Figure 3:
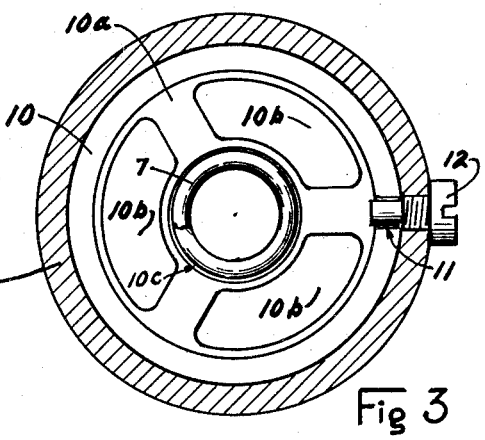
Figure 3 is a section viewed upwardly as at line 3—3 of Fig. 1.
Figure 1:
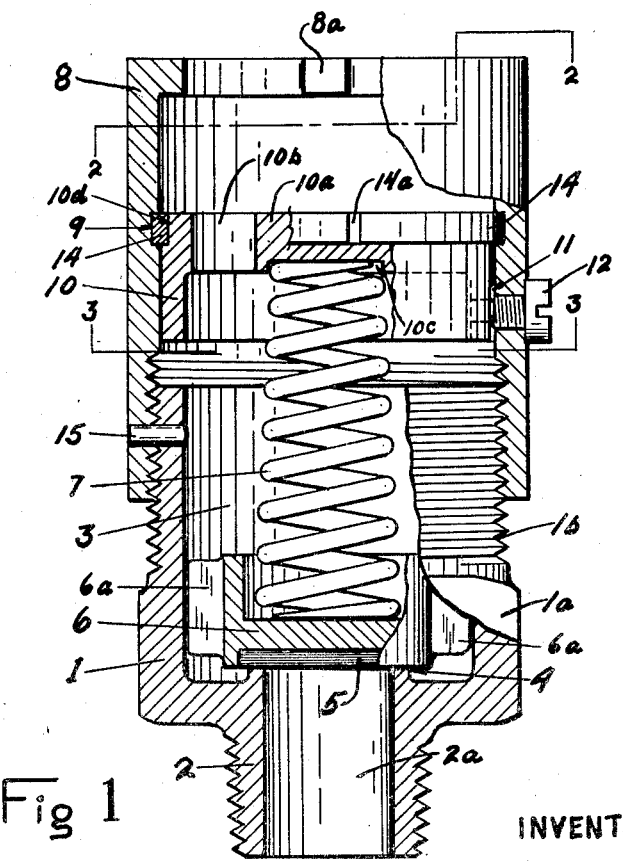
Figure 1 is an elevational view of the valve, in which portions are shown cut away to better illustrate the interior parts.

A detailed description of the several parts, together with their assembly and operation, will now be set forth.

A body member 1, generally cylindrical in shape, is provided with a threaded neck portion 2 suitable for attachment to a pressure vessel or the like, the neck being provided with a duct 2–a for admitting fluid from the pressure vessel into chamber 3 of body 1. The lower portion of the body is hexagonal as at 1–a so that a wrench may be used to attach the valve to the pressure vessel. The external cylindrical surface of body is provided with threads 1–b suitable for threadable attachment to cap 8, such attachment providing means for adjusting and calibrating the valve as will be further explained. Within chamber 3 is a valve seat 4 which terminates duct 2–a, and against which valve disk 5 bears to regulate the fluid flow from duct 2–a to chamber 3.

Valve disk 5, preferably composed of semi-resilient material, is embedded in a circular recess provided in valve guide 6. Oppositely positioned from disk 5 is another circular recess in said valve guide in which one end of spring 7 bears, when compressed, to force disk 5 firmly against valve seat 4. Valve guide 6 is also provided with guide vanes 6–a which slidably bear against the inner smooth walls of chamber 3 whereby the valve guide may freely reciprocate within said chamber.

Cap member 8 is preferably tubular in shape and is internally threaded at one end suitable for engagement with threads 1–b of body 1, such threads performing dual functions of coupling parts 1 and 8, and providing means for adjusting compression of spring 7. The opposite end is vented to atmosphere and is provided with dual purpose lugs 8–a, one purpose being means for engagement of a tool by which the cap may be rotated, another purpose being an abutment to prevent expulsion of spring restrainer 10 under one condition to which the valve is responsive, still another purpose being a means for limiting the release of compression of spring 7 whereby the ultimate low pressure at which the valve will close may be predetermined. The unthreaded internal portion is smoothly bored and contains an annular groove 9 of larger diameter than the normal bore, said groove positioned a predetermined distance from lugs 8–a.

Spring restrainer 10, also cylindrical in shape, is partially enclosed at one end by a head 10–a pierced by ports 10–b and provided with a circular recess suitable for receiving one end of spring 7 providing an abuttment therefor. The external cylindrical surface of 10 is smoothly finished to provide a sliding fit within cap 8. A reduction in diameter of the head end forms a shoulder portion 10–d of length and depth similar in dimension to groove 9 in cap 8, said shoulder engaging a ring of fusible alloy positioned within groove 9. A notch 11 is provided in the tubular wall portion at opposite end such notch loosely straddling stop screw 12 which is threadably positioned in the wall of cap 8 the function of notch and stop screw being to rotate restrainer 10 concurrently with rotation of cap 8.

A ring 14 composed of fusible alloy is circumferentially parted as at 14–a to permit partial collapse for placement within groove of cap 9, the inside diameter of said ring being less than the inside diameter of cap 8 an annular abutment is thus provided for the purpose of limiting movement of restrainer 10 thereby to transmit the ultimate thrust of spring 7 to cap 8.

The method of assembling and the adjustment of the valve will now be described. Ring 14 is positioned within groove 9; restrainer 10 is placed within cap 8 head end 10–a facing lugs 8–a, and moved inwardly until shoulder 10–d bears against the abutment formed by ring 14 as noted supra; valve guide 6 is placed within chamber 3 of body 1 with valve disk 5 bearing firmly against valve seat 4; one end of spring 7 is placed within the recess of valve guide 6; the threaded portion 1–b of body 1 is engaged with the interior threaded portion of cap 8, the other end of spring 7 bearing against recess 10–c of restrainer 10; cap 8 is further rotated in engagement with said threaded portions until spring 7 is compressed sufficient to cancel the thrust of valve 5 caused by a predetermined duct 2–a; whereupon the valve is calibrated to relieve at a predetermined pressure within duct 2–a. A small hole is then bored thru the threaded portion of body a and cap 8, and a pin is tightly fitted therein thus locking the adjustment to prevent unauthorized tampering after calibration.

It will be noted that the ultimate thrust of spring 7 is resisted by fusible ring 14 which is well able to withstand such thrust under normal temperature, and that chamber 3 and extension 8 comprise a cavity subdivided by ported restrainer 10 thus converting said chamber and said extension into primary and secondary expansion chambers respectively, these chambers responsive to refrigerative phenomena of the discharged L. P. G. from duct 2–a.

After calibration the valve may be connected to a pressure vessel containing L. P. G. such as propane whose boiling point is minus 44 deg. Fht. and whose vapor pressure is 172 p. s. i. at 100 deg. Fht., whereupon the valve will function under normal conditions, that is, it will relieve at a predetermined pressure and close at a predetermined lower pressure during such time when liquid propane remains in the vessel and provides a source from which vapor may form and expand, to cool the ring 14 below its melting point, said expansion producing refrigerative phenomena posterior to the seat of said relief valve to cool the structure thereof. This condition holds true even when a minor fire prevails adjacent to the vessel provided the duration of the fire is insufficient to vaporize all of the liquid.

Should the vessel and valve be exposed to elevated temperature of prolonged duration sufficient to vaporize all of the liquid and to melt the fusible ring, then spring 7 will be deprived of a thrust abutment and the potential energy of compression is thus released as kinetic energy to force restrainer 10 toward lugs 8–a thus relieving the spring of energy whereupon valve 5 is unrestrained and relieves the internal pressure of the vessel to atmospheric or some predetermined low pressure of safe value. Under the latter condition, supra, the relative spacing of ring 14 from lugs 8–a determines the ultimate low pressure at which spring 7 acts to seat valve 5; if such distance is less than that required to fully release the compression of the spring, a proportionate low pressure will prevail; should this distance be greater than that necessary to fully release said compression the effect of compression would be voided and no spring restraining effort would be exerted on the valve after fusion of ring 14. The spring having been relieved of stored energy still has mass and weight which, together with the mass and weight of valve disk 5 and valve guide 6, will provide means for seating the valve as a back flow check in preventing counter flow between exterior and interior of the vessel if and when the internal pressure is less than the external pressure. My second object is thus accomplished.

Best operative results will prevail when the valve is installed with the longitudinal axis in a vertical plane.

While I have described my invention as applied to a vessel containing L. P. G. such usage need not be restricted thereto; the contents of the vessel may consist of other liquid fluids which may be vaporized with or without refrigerative phenomena.

The drawings and description disclose a preferred form of construction but it is understood that other forms of construction may be made by the skilled artisan without departing from the basic scope of my invention as set forth in the claims.

What I claim as new and desire to secure by Letters Patent is:

1. In a relief valve of the character described comprising a body member having means for attachment to a source of pressure, an expansion chamber therein, a duct communicating with said chamber and said source of pressure, a valve seat terminating said duct within said chamber, a valve slidable within said chamber, said valve movable in and out of engagement with said seat to open or close said duct, said chamber of greater area than said duct, a bored cylindrical extension threadably attached at one of its ends to said chamber anterior to said valve seat the other end open to atmosphere, an annular groove in said bore positioned substantially posterior to the open end thereof, a ring of fusible alloy positioned within said groove said ring of less internal diameter than said bore to form an abutment therein, a slidable spring restrainer within said bore positioned in posterior engagement with said ring, said restrainer having ports intercommunicating between said chamber and atmosphere thru said extension, the combined area of said ports less than the area of said extension yet greater in area than the area of said duct, and spring loading means bearing on said restrainer and said valve to control the flow of a fluid thru said duct, whereby under normal operation as a spring loaded relief valve the flow of fluid expands in said chamber, contracts and increases in velocity when passing thru the ports of the restrainer, and further expands in said extension before exit to atmosphere, thereby producing refrigerative phenomena to cool said fusible ring under one condition to which the valve is responsive.

2. A condition responsive pressure relief valve comprising a body member, an expansion chamber therein, means for attachment to a pressure vessel, a duct intercommunicating between said chamber and the vessel, a valve seat within chamber terminating said duct, the area of said duct being less than the internal area of said chamber, a valve slidable within said chamber in and out of engagement with said valve seat, a bored cylindrical extension threadably attached to said body member said extension elongating said chamber and providing atmosphere communication therewith, the bore thereof of greater area than the internal area of said chamber, an annular groove within said bore in the wall of said extension said wall of minimum thickness at the perimeter of said groove to limit heat conduction thru the solids thereof, a ring of fusible alloy within said groove said ring of less internal diameter than said bore to form an annular fusible abutment therein anterior to said valve, restraining means slidable within said bore posterior to said fusible abutment, said means having plural ports intercommunicating between said chamber and atmosphere thru said bored extension the combined area of said ports less than the free area of said bore yet greater in area than the area of said duct, spring loading means positioned between said restraining means and said valve, and means to rotate said extension in relation to said body whereby said fusible abutment engages said restraining means to compress the spring loading means against the valve to seat the same at a predetermined pressure within said vessel.

3. A condition responsive pressure relief valve structure comprising a body member having means for attachment to a pressure vessel, a primary expansion chamber within said body, a duct intercommunicating between said vessel and said chamber the duct of less area than the chamber, a valve seat at one end of said chamber terminating said duct, a valve slidable within the chamber in and out of engagement with said seat, a bored cylindrical extension threadably attached to said body member adjoining the other end of said chamber the bore thereof greater in area than the area of said chamber, one end of said bore open to atmosphere, an annular groove within said bore in the wall of said extension substantially posterior to the open end thereof, said wall of minimum thickness at the perimeter of said groove, a collapsible fusible ring positioned within said groove its internal diameter less than the diameter of said bore to form an annular abutment within said bore anterior to said valve, restraining means slidable within said bore normally in posterior engagement with said fusible ring, said means having ports intercommunicating between said chamber and atmosphere thru that portion of said bore anterior to said groove to provide a secondary expansion chamber in the last mentioned portion of said bore, the combined area of said ports less than the free area of said bore yet greater than the area of said duct, spring loading means between said restraining means and said valve, and means to rotate said extension to urge said spring to seat said valve at a predetermined pressure in said duct, the herein claimed structure providing means whereby the valve may be unseated by higher pressure in said duct and/or unseated by fusion of said ring at predetermined temperature said fusion dependent on ambient temperature within said expansion chambers together with temperature external to said structure.

4. A conditions responsive valve of the character described for protecting liquified petroleum gas containers comprising in combination means for attachment to a container, pressure actuated means effective to relieve the container of vapor products of said gas at predetermined pressure value, spring powered restraining means effective to retain said pressure responsive means, plural expansion chambers responsive to refrigerative phenomena generated by the expansion of said liquified petroleum gas when same is relieved by said pressure actuated means, and thermal actuated holding means of fusible alloy to form an abutment for said spring restraining means, said alloy encircling the expanded flow stream discharge of said vapor products within said chambers and positioned at a point within the valve structure between said chambers where it is concurrently minimum responsive to external heat conducted thru the solids of said structure and maximum responsive to internal expansion generated ambient temperature at said point, said holding means effective to maintain the restraining means in active status when in the solid state and to null said status when fused, thereby to relieve the internal pressure of the container to atmospheric pressure.

5. The combination claimed in claim 4 in which said pressure actuated means is also a gravity actuated means to prevent counterflow between atmosphere and the container when the internal pressure of the container is less than atmosphere, said means post operative in relation to fusion of said alloy, substantially as described.

6. In a relief valve for protecting liquified petroleum gas containers said relief valve having spring powered means to seat a valve to retain said gas at predetermined pressure, and pressure actuated means effective to overpower the first means to relieve said pressure to a lower valve, the combination therewith of an expansion chamber posterior to said valve to receive its discharge one end thereof open to atmosphere, said chamber generally an elongated cylinder surrounding said spring powered means the open end thereof extending laterally beyond said means, the internal area thereof greater than the discharge area of said valve, the interior thereof responsive to expansion generated temperatures of said gas, an annular groove within said cylinder in the wall thereof substantially posterior to said open end, said wall of minimum thickness at the perimeter of said groove, and a ring of fusible alloy positioned in said groove the inner diameter of said ring less than the inner diameter of the cylinder to form an annular fusible abutment for said spring powered means, said alloy encircling the expanded flow stream from said valve, the claimed position of said alloy in the extension and its relation to the expanded flow stream providing means whereby the alloy is co-responsive to the thermal values of said stream and external ambient temperature at the valve structure under one condition to which the relief valve is responsive, and said alloy is responsive to ambient temperature at said structure together with conducted heat thru the solids of said structure under another condition to which the valve is responsive.

7. A two stage pressure relief valve responsive to pressure under one condition and/or responsive to different external-internal temperature under another condition, said valve comprising means for attachment to a source of pressure, a body member having a duct communicating with said source of pressure and an outlet vent communicating with atmosphere, a cavity within said body median between said duct and said outlet vent said cavity comprising primary and secondary expansion chambers, a valve seat within said body terminating said duct, a valve movable within said body in and out of engagement with said valve seat, a compressible spring within said body anterior to said valve one end of the spring indirectly affixed to the body by thermal responsive abutment means the opposite end bearing against the valve to seat the same against said seat, and adjustable means for compressing said spring whereby the valve will seat or unseat at predetermined pressures, said abutment means composed of fusible metal alloy affixed to said body member effective to hold the spring compressed at predetermined value when said allow is in solid state and to release all spring compression when the alloy is fused at a predetermined abnormal temperature thereby permitting unrestrained unseating of said valve, said fusible alloy positioned between said expansion chambers within said cavity to encircle the expanded flow stream of a fluid discharged from said duct.

References Cited in the file of this patent

UNITED STATES PATENTS

| Number | Name | Date |
|---|---|---|
| 752,099 | Palmer | Feb. 16, 1904 |
| 1,944,518 | Lovekin | Jan. 23, 1934 |
| 1,960,272 | Lovekin | May 29, 1934 |
| 2,271,786 | Watkins | Feb. 3, 1942 |